United States Patent [19]

Hoyle et al.

[11] Patent Number: 4,705,439

[45] Date of Patent: Nov. 10, 1987

[54] MACHINE TOOL COLLET CONTAINING MEANS FOR PASSING A CUTTING FLUID THERETHROUGH

[75] Inventors: William Hoyle, Knoxville; Jammie Graves, Lenoir City, both of Tenn.

[73] Assignee: General Electric Company, Detroit, Mich.

[21] Appl. No.: 862,612

[22] Filed: May 12, 1986

[51] Int. Cl.[4] .................. B23B 31/20; B23B 51/06; B23C 5/28

[52] U.S. Cl. .................. 409/136; 279/46 R; 279/51; 408/56

[58] Field of Search ............. 279/46 R, 46 A, 47, 279/48, 50–53, 20; 408/56, 57, 59, 60; 409/135, 136

[56] References Cited

U.S. PATENT DOCUMENTS 2,889,150 6/1959 Goldring et al. ............. 279/20 X
4,570,952 2/1986 Heimbigner et al. ............. 408/56 X

FOREIGN PATENT DOCUMENTS 13645 7/1980 European Pat. Off. .......... 279/46 R

Primary Examiner—Gil Weidenfeld
Assistant Examiner—Steven C. Bishop
Attorney, Agent, or Firm—Hedman, Gibson, Costigan & Hoare

[57] ABSTRACT

Disclosed is a machine tool collet having a collet body having a shaft for receiving a cutting tool at a forward open end thereof and a rearward open end insertable into a tool holder means, at least one first axial slit opening into the rearward open end of the shaft and at least one second axial slit opening into the forward open end of the shaft, and a transverse channel connecting the first and second axial slits to thereby provide a pathway for the flow of a fluid from the rearward open end of the shaft to the forward open end of the shaft to thereby enable the fluid to move from the cutting tool machine through the collet to the workpiece during the cutting operation.

6 Claims, 5 Drawing Figures

MACHINE TOOL COLLET CONTAINING MEANS FOR PASSING A CUTTING FLUID THERETHROUGH

FIELD OF THE INVENTION

The present invention is directed to a collet or anchor for securing a cutting tool or the like in a cutting machine having a transverse channel for connecting a series of axial slits to provide a continuous pathway for the flow of a cutting fluid such as a coolant and/or a lubricant from the cutting machine through the collet to the workpiece.

BACKGROUND OF THE INVENTION

Collets are used in conjunction with cutting machines such as lathes and drill presses to secure a cutting tool such as a drill bit in place when machining a workpiece. The cutting tool is inserted into one end of the collet and the opposed end of the collet is inserted into a tool holder of a cutting machine.

In order to provide a secure fit for the cutting tool within the collet, the collet is typically made with a series of spaced apart axial slits around the circumference of the collet. Typically, there are alternating series of slits wherein one of the series of slits opens into the end of the collet which is inserted into the cutting machine and the next slit in the series opens into the end of the collet which receives the cutting tool. These alternating slits make it possible for the collet to expand or contract around the cutting tool thereby providing a secure fit.

As is well known, collets are used in conjunction with machines and/or workpieces that rotate at great speeds to obtain accurate and smooth cuts. Accordingly, a high degree of frictional force is developed at the cutting site resulting in high temperatures. It is therefore necessary to continuously cool and/or lubricate the workpiece to avoid tool and workpiece failure.

Heretofore such cutting machines have been equipped with externally mounted cutting fluid systems which provide a continuous supply of cutting fluid to the workpiece. Such systems typically have a hose and a nozzle directed at the workpiece. The hose and nozzle are affixed to the outside of the cutting machine and may automatically shut off when the cutting operation is terminated.

Such cutting fluid systems, however, suffer from major disadvantages. They are expensive to install and thereby add greatly to the cost of the basic cutting machine. Further, since cutting fluid systems are mounted externally to the machine itself, they are subject to breakdowns due to inadvertant damage caused by operators working with the cutting machine.

The present invention overcomes these disadvantages by providing a collet having a transverse channel connecting the existing expansion axial slits to provide a continuous pathway for the flow of the cutting fluid from the cutting machine through the collet to the workpiece. As a result of the present invention, the external cutting fluid systems are eliminated and there is a more even distribution of the cutting fluid to the workpiece.

It is therefore an object of the present invention to provide a collet for holding a cutting tool which also provides a pathway for the even and continuous flow of a cutting fluid from a cutting machine to a workpiece.

It is a further object of the invention to provide a means for eliminating the external cutting fluid systems which are typically used in conjunction with cutting machines.

SUMMARY OF THE INVENTION

The present invention is directed to a collet for holding a cutting tool which provides a pathway for the flow of a cutting fluid such as a coolant and/or lubricant from a cutting machine such as a drill press through the collet to a workpiece. The collet comprises a collet body having a hollow center shaft, a forward open end for receiving a cutting tool, and an opposed rearward open end which is inserted into a cutting machine. The collet body has at least one first axial slit opening into the rearward end of the collet body and terminating before the forward end, and at least one second axial slit opening into the forward end and terminating before the rearward end of the collet body. Means for connecting the first and second axial slits is also provided which comprises a transverse channel forming a pathway between at least one of the first and at least one of the second axial slits to enable the cutting fluid to flow from the cutting machine through the collet and enter onto the workpiece.

The transverse channel is positioned in the outside surface of the collet body at a point just forward of the rearward end of the cutting tool when the cutting tool is positioned in the collet body ready for cutting. In other words, the transverse channel is located between the forward open end of the collet body and the rearward end of the cutting tool where the cutting tool is in cutting position and fully secured within the collet. In a preferred form of the invention, the transverse channel is continuous about the entire collet body thereby providing a connection between each of the first and second axial slits. It is also preferred that the transverse channel be substantially perpendicular to each of the first and second axial slits.

The rearward end of the collet is inserted into a tool holder of the cutting machine which contains an axial channel for supplying cutting fluid from a cutting fluid source within the cutting machine to the shaft of the collet. When the cutting fluid enters the shaft its path is blocked by the rearward end of the cutting tool. As a result, the cutting fluid moves radially from the shaft to the first axial slits which open into the rearward end of the collet.

The cutting fluid flows forward via the first axial slits to the transverse channel where at least some of the fluid enters the channel. The fluid in the channel then enters the second axial slits and flows therein until the cutting fluid exits the openings of the second axial slits at the forward end of the collet. Since the cutting fluid is forced into the collet under pressure, the cutting fluid exits the collet in a pressurized stream directly at the workpiece thereby providing complete coverage of the workpiece during the cutting operation.

BRIEF DESCRIPTION OF THE DRAWINGS

The following is a detailed description together with accompanying drawings of illustrative embodiments of the invention. It is to be understood that the invention is capable of modification and variation apparent to those skilled in the art within the spirit and scope of the invention.

Figure 1:
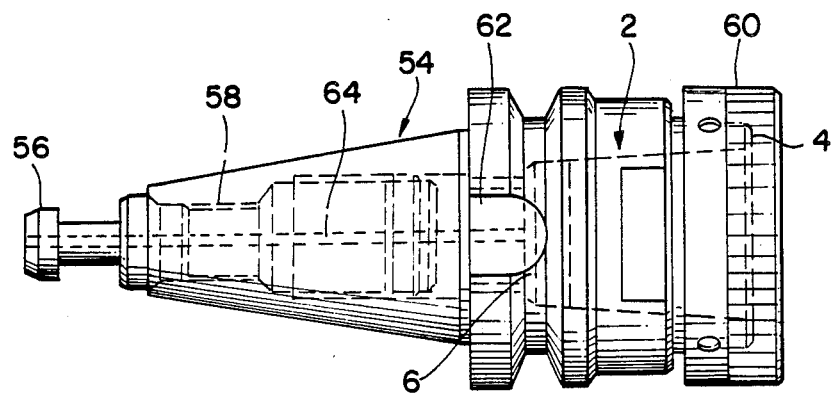
FIG. 1 is a plan view showing a machine tool holder and the collet of the present invention positioned therein for receiving a cutting tool.

Referring first to FIGS. 2-5, the collet 2 comprises a forward open end 4 into which is inserted a cutting tool 50 such as a drill bit and a rearward open end 6 which is inserted into a tool holder 54 as shown in FIG. 1 and as described in more detail hereinafter.

The collet 2 also includes a collet body 8 having a wall 10 defining a hollow shaft 11 for receiving the cutting tool 50. The wall 10 has therein at least one first axial slit 12 and at least one second axial slit 14. As shown in FIGS. 2-5, it is preferred to have a series of alternating first axial slits 12 and second axial slits 14. The first axial slits 12 and the second axial slits 14 are connected via a transverse channel 16 to provide a pathway for the flow of a cutting fluid from the rearward open end 6 to the forward open end 4 as indicated by the arrows shown specifically in FIG. 2.

The collet 2 also has a recess 18 formed between a rim 20 of the collet body 8 and a rim 24 of a neck 22 which runs from the recess 18 to the forward open end 4. The neck 22 engages the cutting tool to secure the cutting tool 50 within the collet and the recess 18 anchors the collet within the tool holder 54 as shown in FIG 1. The collet body 8 may also contain a grind relief recess 26 which is customarily used to enable the collet 2 to expand or contract around the cutting tool 50 in a known manner to further secure the cutting tool 50 within the collet 2.

The first axial slits 12 have openings 28 for receiving the cutting fluid from a cutting machine (not shown). The openings 28 lead to corresponding pathways 30 which terminate at ends 32 before the forward open end 4.

The second axial slit 14 open into the forward open end 4 of the collet body 8 at corresponding openings 44 and terminate at corresponding ends 34 before the rearward open end 6 of the collet body 8 to thereby define corresponding pathways 36. The second axial slits 14 include openings 38 leading into coaxial slits 40 within the recess 18 which in turn lead into coaxial slits 42 in the neck 22 to thereby form a continuous pathway for the flow of the cutting fluid from the transverse channel 16 through the pathways 36 and out to the workpiece (not shown) via openings 44 in the neck 22.

The first axial slits 12 are connected to the second axial slits 14 through the transverse channel 16. The tranverse channel 16 includes openings 46 for receiving the flow of cutting fluid from the first axial slits 12 and openings 48 leading to the second axial slits 14 so that the cutting fluid can flow into the second axial slits 14 and out the corresponding openings 44.

Referring to FIG. 1, the collet 2 is inserted into a corresponding cavity within the tool holder 54 which is insertable into a suitable cutting machine. The tool holder 54 includes a retention knob 56 which is inserted into the cutting machine (not shown) to thereby lock the tool holder 54 within the cutting machine. The tool holder 54 may also include a frictional clamp 62 to assist in locking the tool holder 54 within the cutting machine. An adjuster 58 which may be in the form of a screw lies within the body 59 of the tool holder 54 and is used to adjust the position of the collet 2 to thereby raise or lower the depth of the cutting tool 50 (see FIG. 2) within the collet 2. A chuck 60 surrounds the collet 2 in the vicinity of the forward open end 4 to thereby securely lock the cutting tool 50 within the collet 2.

Running axially through the tool holder 54 and into the rearward open end 6 of the collet 2 is a channel 64 through which the cutting fluid flows from the cutting machine to the collet 2.

Figure 2:
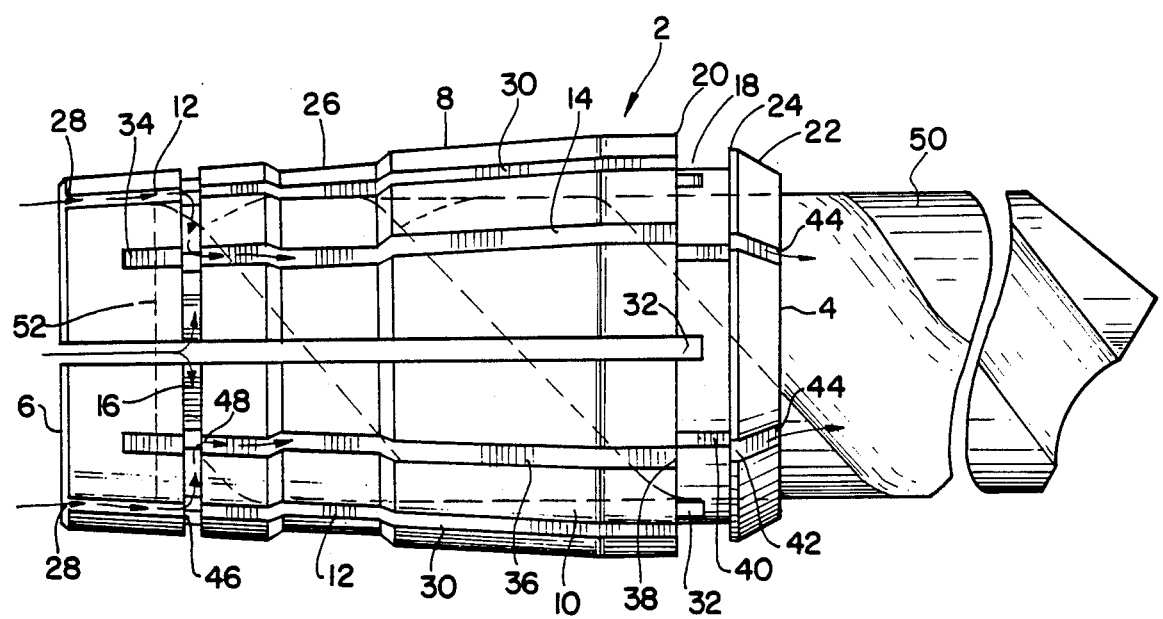
FIG. 2 is a plan view of the collet of the present invention showing a cutting tool positioned therein and further showing the pathway by which the cutting fluid flows through the collet during the cutting operation.
Figure 3:
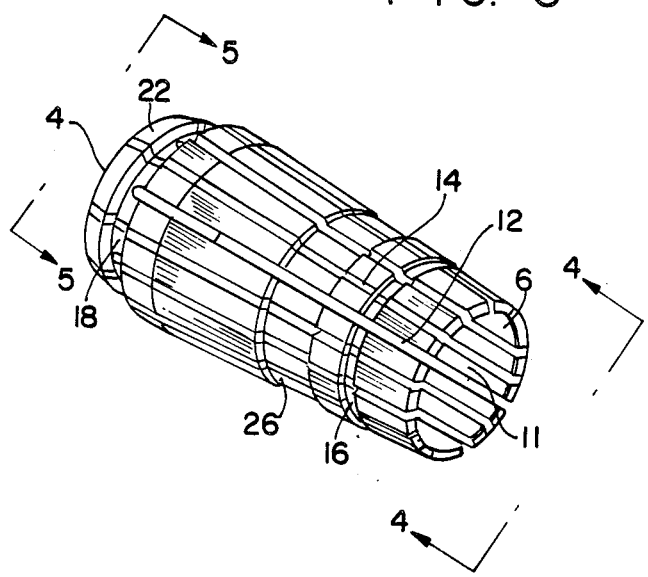
FIG. 3 is a perspective view of the collet shown in FIG. 2.
Figure 4:
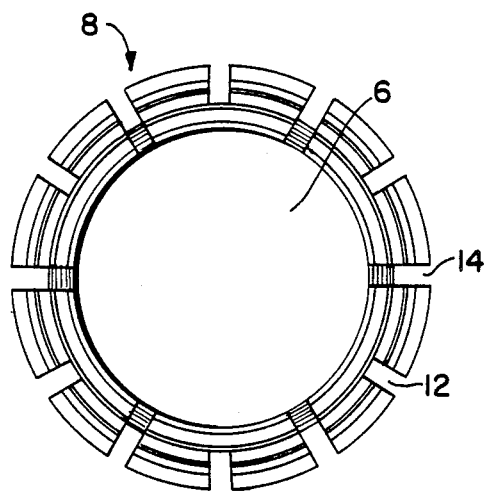
FIG. 4 is a cross-sectional view of the collet of FIG. 3 taken through line 4—4.
Figure 5:
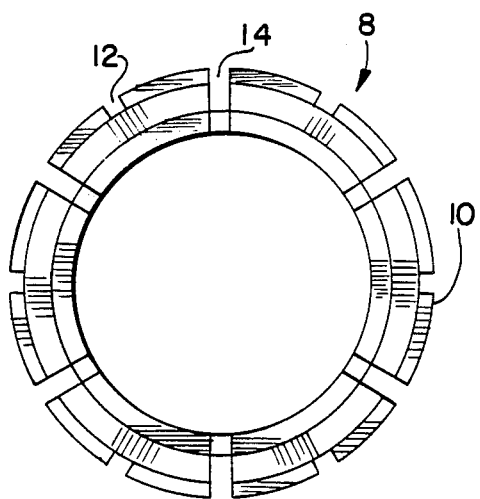
FIG. 5 is a cross-sectional view of the collet of FIG. 3 taken through line 5—5.

The flow of the cutting fluid through the collet 2 to the workpiece is shown in FIG. 2. The cutting fluid enters the rearward open end 6 of the collet 2 from the channel 64 and into the shaft 11 where its path is blocked by the rearward end 52 of the cutting tool 50 (e.g. a drill bit). The cutting fluid is forced towards the wall 10 of the collet 2 by the centrifugal force generated by the rotation of the tool holder 54 during the cutting operation. The cutting fluid is thus forced to enter the openings 28 of the first axial slits 12 and flows out of the openings 46 into the transverse channel 16. The cutting fluid then continues to flow through the transverse channel 16 until it enters the openings 48 of the second axial slits 14. The cutting fluid then flows through the pathways 36, through the openings 38 and through the coaxial slits 40 of the recess 18 and the coaxial slits 42 of the neck 22 until the cutting fluid exits from the collet 2 via the openings 44 at the forward open end 4 of the collet body 8 to thereby contact the workpiece.

As would be apparent to those skilled in the art, the collet 2 may be fashioned with any number of pairs of first 12 and second 14 axial slits so long as there is at least one first axial slit 12 connected to at least one second axial slit 14 via the transverse channel 16. The number of second axial slits 14 determines the number of pathways for the flow of the cutting fluid to the workpiece since only the second axial slits 14 open into the forward open end 4 of the collet 2.

It is also within the scope of the invention that the collet 2 may have more than one consecutive first 12 and/or second 14 axial slit. All that is required is that the cutting fluid be able to flow from the first axial slits 12 to the second axial slits 14 so that there is a continuous pathway for the flow of the cutting fluid from the rearward open end 6 through the collet 2 and out the forward open end 4 to thereby contact the workpiece.

what we claim is:

1. A machine tool collet comprising:
   (a) a collet body having a wall having an outer and inner surface, the inner surface of the wall defining a hollow shaft wherein the shaft has a forward open end for receiving a cutting tool and an opposed rearward open end insertable into a tool holder means;
   (b) at least one first axial slit running through the wall of the collet body and thereby communicating with the shaft, the first axial slit having an opening into the rearward open end of the shaft and terminating before the forward open end of the shaft;
   (c) at least one second axial slit running through the wall of the collet body and thereby communicating with the shaft, the second axial slit having an opening into the forward open end of the shaft and terminating before the rearward open end of the shaft; and (d) a grind relief recess; and (e) means in addition to the grind relief recess connecting the first and second axial slits, said connecting means enabling a machine fluid to readily flow from the rearward open end of the shaft to the forward open end of the shaft when a cutting tool is in the tool cutting position within the shaft.

2. The machine tool collet of claim 1, wherein the fluid flow means connecting the first and second axial slits comprises a transverse channel in the outer surace of the wall of sufficient cross-sectional area to enable said machine fluid to readily flow therethrough, the transverse channel being positioned between the forward open end of the shaft and the rearward end of the cutting tool when the cutting tool is in the tool cutting position within the shaft.

3. The machine tool collet of claim 1, further comprising a plurality of first and second axial slits in spaced apart relationship around the entire collet body.

4. The machine tool collet of claim 3 wherein the first and second axial slits are in an alternating relationship around the entire collet body.

5. The machine tool collet of claim 4 wherein the transverse channel traverses each of said first and second axial slits to thereby provide a path way for the flow of the fluid from anyone of said first axial slits to anyone of said second axial slits.

6. The machine tool collet of claim 1, wherein the transverse channel is substantially perpendicular to the first and second axial slits.

* * * * *